United States Patent [19]

Pierson

[11] 3,974,850

[45] Aug. 17, 1976

[54] HIGH VOLUME FLUID PRESSURE RELIEF VALVE

[75] Inventor: Karl B. Pierson, Warren, Pa.

[73] Assignee: Betts Machine Company, Warren, Pa.

[22] Filed: Apr. 24, 1975

[21] Appl. No.: 571,229

[52] U.S. Cl. .......................... 137/493.9; 251/337; 251/313
[51] Int. Cl.² .................................... F16K 17/26
[58] Field of Search ........... 137/529, 535, 536, 537, 137/493–493.9; 251/313, 337

[56] References Cited
UNITED STATES PATENTS

| | | | |
|---|---|---|---|
| 2,206,425 | 7/1940 | Perman | 137/537 |
| 2,596,982 | 5/1952 | Chisholm | 137/493.5 |
| 2,756,106 | 7/1956 | Schenk | 137/537 X |
| 3,289,686 | 12/1966 | Tyer | 137/537 X |
| 3,767,160 | 10/1973 | McCollum | 251/313 X |

Primary Examiner—Henry T. Klinksiek
Attorney, Agent, or Firm—Baldwin, Egan, Walling & Fetzer

[57] ABSTRACT

A high volume, fluid pressure relief valve for the top of a vent opening in a fluid storage tank. The valve includes a valve member which is reciprocal to and from a valve seat disposed in alignment with the vent opening. Constant force spring means coact with the valve member for normally retaining the valve member in closed condition, whereby the fluid pressure force required to move the valve member remains substantially constant throughout the travel of the valve member. A large venting capacity is provided in a single compact valve device and the valve is so constructed and arranged that pilferage from the storage tank is prevented. Also the valve may include an arrangement allowing "in-breathing" of the storage tank.

20 Claims, 13 Drawing Figures

HIGH VOLUME FLUID PRESSURE RELIEF VALVE

This invention relates in general to pressure relief valves, and more particularly to a high volume pressure relief valve for use in connection with tanks or containers for storage or transportation of liquids or fluids.

BACKGROUND OF THE INVENTION

There are many types of fluid pressure relief or vent valves known for use with liquid or fluid storage tanks. These tanks may be of the type, for instance, that are transported by truck or rail and which many times are adapted to be transferred aboard a ship at dockside. Many times these tanks contain flammable liquids, and the various governmental regulatory agencies, such as, for instance, the Department of Transportation, or the Coast Guard, require that sufficient venting capacity be provided to take care of expanding vapors in a storage tank in the event of fire. This venting capacity is adapted to prevent the rupture of the tank and may require a venting capacity as high as for instance, 400,000 cubic feet per hour.

So far as I am aware, prior art venting arrangements have not been able to provide a large venting volume utilizing a single device or valve, and still remain within acceptable size limits for the device. Moreover, many prior art venting arrangements are exposed to the elements or weather, and many times are subject to being tampered with, resulting in the possibility of pilferage of the contents of the tank.

SUMMARY OF THE INVENTION

The present invention provides a high volume pressure relief valve mechanism which is of relatively compact nature for normally sealing the vent opening in a fluid storage tank, and which includes constant force spring means urging the valve member toward closed condition, whereby the force required to move the valve member remains substantially constant throughout the travel of the valve member. The valve mechanism is of compact nature, and which embodies a weather shield which also resists tampering and pilferage of the contents of the storage tank.

Accordingly, an object of the invention is to provide a pressure relief valve for a fluid storage container or tank which has a high volume capacity for venting gas therethrough in the event that the pressure within the storage tank rises above a predetermined level.

A still further object of the invention is to provide a valve mechanism of the latter mentioned type which will remain open in the event that the pressure within the storage tank rises above a predetermined level.

A further object of the invention is to provide a valve mechanism of the above described type which includes means for urging the valve toward a normally closed position and wherein such means comprises a constant force spring arrangement.

A still further object of the invention is to provide a compact pressure relief valve mechanism for a storage tank which has the capacity to vent fluid pressure from the tank at a rate of for instance 400,000 cubic feet per hour, and wherein the valve mechanism is substantially tamper proof to prevent pilferage of the contents of the storage tank.

A still further object of the invention is to provide a valve mechanism of the aforedescribed type which includes in-breathing means in the valve mechanism, to provide for intake of fluid pressure when the fluid pressure interiorly of the associated storage tank falls below a predetermined amount.

Another object of the invention is to provide a pressure relief valve which includes a shield for aiding in weather proofing the valve mechanism, and for making the valve mechanism tamper proof to eliminate pilferage of the contents of the storage tank.

Other objects and advantages of the invention will be apparent from the following description taken in conjunction with the accompanying drawings wherein FIG. 1 is a sectioned elevational view of the pressure relief valve mechanism of the invention as mounted in the vent opening of a storage tank, the latter being shown in phantom.

DESCRIPTION OF PREFERRED EMBODIMENTS

Figure 1:
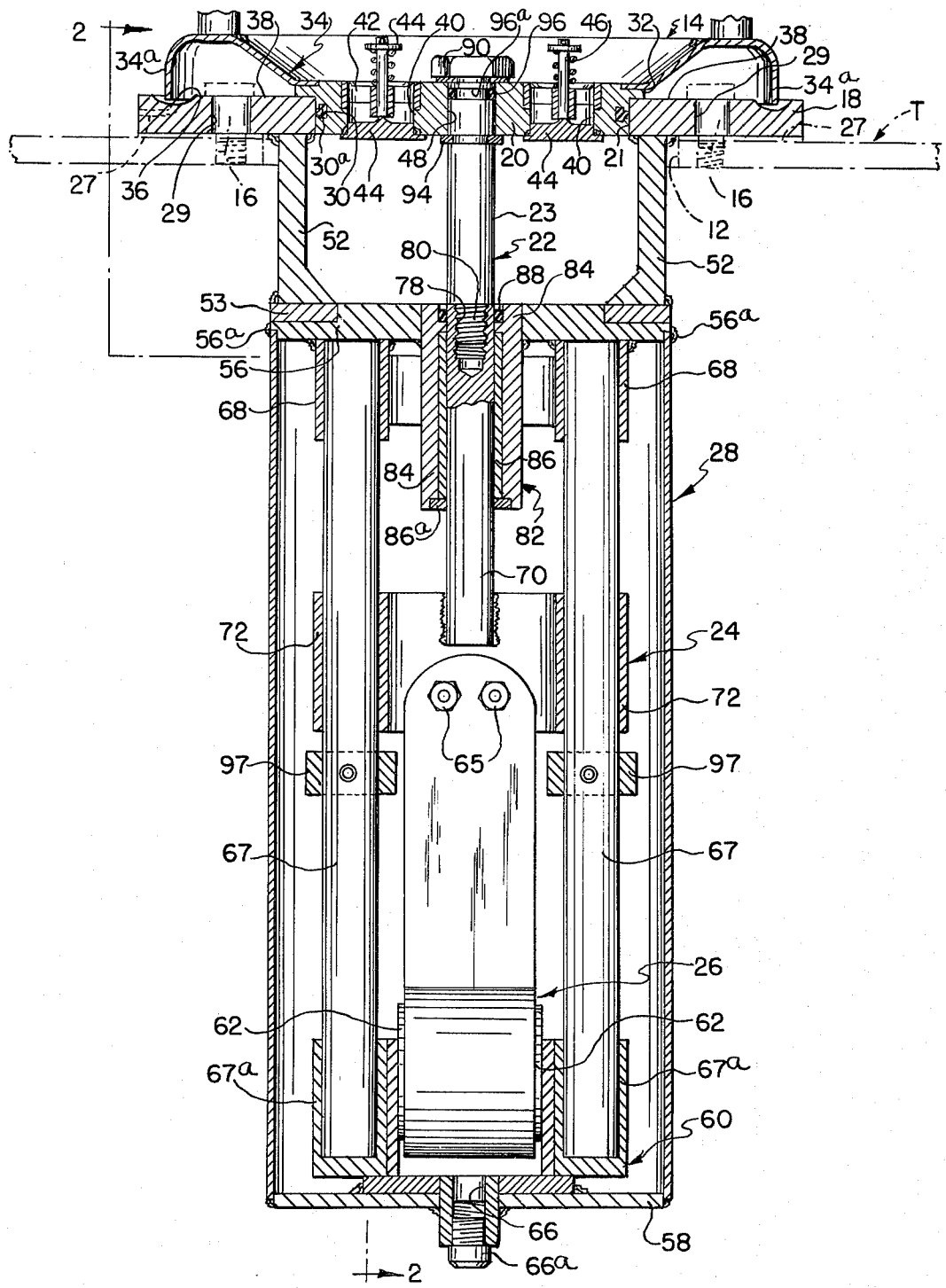

While the relief valve of the invention is shown and described herein with reference to vent valves applied to fluid storage tanks, such as, for instance, portable gasoline tanks, it will be understood that such valve mechanism may be utilized with other types of fluid containers.

Referring again to the drawings, there is shown a fluid storage tank T, such as, for instance, a gasoline storage tank, having an opening 12 formed in the top wall thereof, with the pressure relief valve mechanism 14 of the invention mounted in the opening 12 as by means of threaded fasteners 16.

In general valve mechanism 14 may include a valve seat member 18 having an aperture 21 therethrough which is disposed in communicating alignment with the vent opening 12 in the tank T, when the valve mechanism is mounted on the tank, a valve member 20 adapted when in closed condition to coact with the seat member 18 and seal the aperture 21 (and thus vent opening 12), a coupling structure 22, which includes upper stem 23 connecting the valve 20 to lower stem and guide assembly 24, to which is attached constant force spring means 26, with the spring means and the lower stem and guide assembly 24 being enclosed by a sealed container or canister 28 which prevents the contents of the storage tank from coming into contact with the aforementioned spring means and guide assembly components of the valve mechanism.

The pressure relief valve mechanism is of compact nature, presenting a relatively low profile on the exterior of the tank, and is readily positionable in the vent opening 12 of the storage tank, with the seat 18 being detachably fastened from exteriorly of the tank, as aforementioned, by fasteners 16 extending through openings 29 in the seat. Suitable sealing means 27 (FIG. 1) can be disposed between the underside of the seat 18 and the tank, to prevent leakage of fluid gases between the tank and the valve seat member. The aperture 21 in seat 18, in the embodiment illustrated, is in general alignment with tank opening 12, with the valve member 20 having a side circumferential groove 30 formed therein, for receiving a sealing means, such as, for instance, a T-shaped (in cross section) sealing ring 30a, which seals the valve member with respect to the seat 18 in the closed condition of the valve member 20 on the seat. As can be seen from FIG. 1, the valve member has a circumferential lip 32 which overlaps and is adapted for engagement with the top surface of the seat 18, and limits inward travel of the valve member with respect to the aperture 21.

The valve member 20 may include a cover portion 34 which projects laterally from the valve member 20, and which terminates in a downwardly extending outer peripheral edge 34a which is received within an upwardly facing groove 36, formed in the upper surface 38 of the seat 18. As can be seen from FIGS. 1 and 4, the terminal end of the edge 34a extends below the aforementioned upper surface 38, and above the bottom surface of the groove 36. The outer side surface of the groove 36 slopes upwardly and outwardly, so that the exhaust fluid from the interior of the tank when the tank pressure reaches a predetermined amount and causes opening of the valve member 20, will flow upwardly into the cavity defined by the underside of the cover portion, and then out diagonally through the groove 36 to atmosphere. The upwardly and then downwardly sloping configuration of the cover portion interior aids in providing an umbrella pressure effect wherein the escaping exhaust fluid from the tank interior aids in causing upward lifting movement of the valve 20 when it so moved by fluid pressure in the tank to open the aperture 21.

Valve 20 may be provided with in-breathing vents 40 defined by through openings in the valve member 20, with spider support structure 42 being disposed in each such vent opening supporting a spring loaded poppet type secondary valve 44 therein, which is adapted for sealing coaction with the lower peripheral lip of the respective opening 40, to ordinarily seal such in-breathing openings from atmosphere. In the event that a vacuum condition or a predetermined pressure condition of less amount than a predetermined pressure is inside the tank, the poppets 44 open against the resistance to compression of the associated spring 46, to cause atmospheric air to flow into the tank and equalize the pressure, whereupon the poppets once again close, thereby once again sealing the interior of the tank from the exterior thereof.

Valve member 20 has a central opening 48 provided therethrough, through which extends the aforementioned upper stem member 23 which is part of the coupling means 22 coupling the valve member 20 to the aforementioned spring means 26 which urges the valve member toward closed condition. A more detailed description of upper stem 23 will be hereinafter set forth. Posts 52 may be provided in depending relation from the underside of the seat 18 and support on the underside thereof a ring 53, to which in turn is detachably connected as by means of threaded fasteners 54 the aforementioned housing or container 28 extending downwardly into the interior of the tank T.

Housing 28 which may be of cylindrical configuration in horizontal cross section, may include a top plate 56 which may be sealingly attached as by welds 56a, to the side wall of housing 28. As can be seen, the diameter of the valve mechanism including the housing 28 is such that it fits readily through the opening 12 in the tank.

The housing 28 also includes a base plate 58 on which is mounted in secured relation bracket structure 60, which provides for rotatably mounting spools 62 thereon of the constant force spring means 26. Spools 62 may be mounted as by means of spindles 64 on the bracket 60 and are adapted to rotate with respect to the bracket 60. The constant force spring steel tape of each spring means 26 is wound about the respective spool 62, and attached at its distal end, as at 65, to lower stem and guide assembly 24 of coupling 22. A drain 66 including a sealing closure plug 66a can be provided in the bottom of the housing.

A pair of guide columns 67 are mounted in socket portions 67a in bracket 60, and extend upwardly to be disposed in upper socket portions 68 on top plate 56 of the housing.

The aforementioned lower stem and guide assembly 24 includes lower stem 70 extending upwardly from spaced, connected tubular guides 72, for detachable coupling to upper stem 23, for attaching the valve member 20 to the spring means 26. The tubular guides 72 on assembly 24 coact with the columns 67 in sliding relation to guide the movement of the coupling 22 upwardly and downwardly upon opening and closing movement of the valve member 20.

Figure 7:
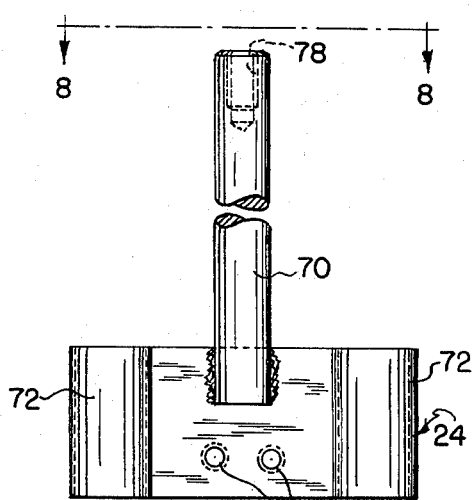
FIG. 7 is a elevational view of the lower stem and guide assembly utilized in the valve mechanism of FIGS. 1 through 3.
Figure 8:
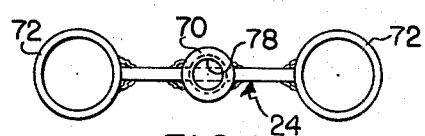
FIG. 8 is a plan view of the FIG. 7 assembly as taken generally along the plane of line 8—8 of FIG. 7 looking in the direction of the arrows.
Figure 9:
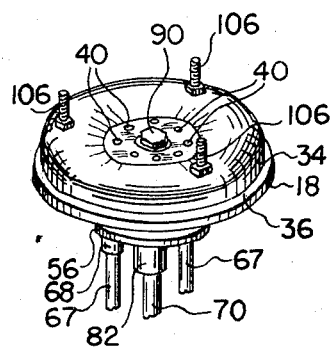
FIG. 9 is a perspective view taken from the upper end of the valve mechanism, with the weather proofing and tamper proofing shield removed from the valve assembly.

The upper end of the lower stem section 70 includes a preferably threaded socket 78 (FIGS. 1, 7 and 8) which is adapted for threaded coaction with the threaded shank portion 80 (FIGS. 1 and 10) of the upper stem 23 of coupling 22.

Figure 2:
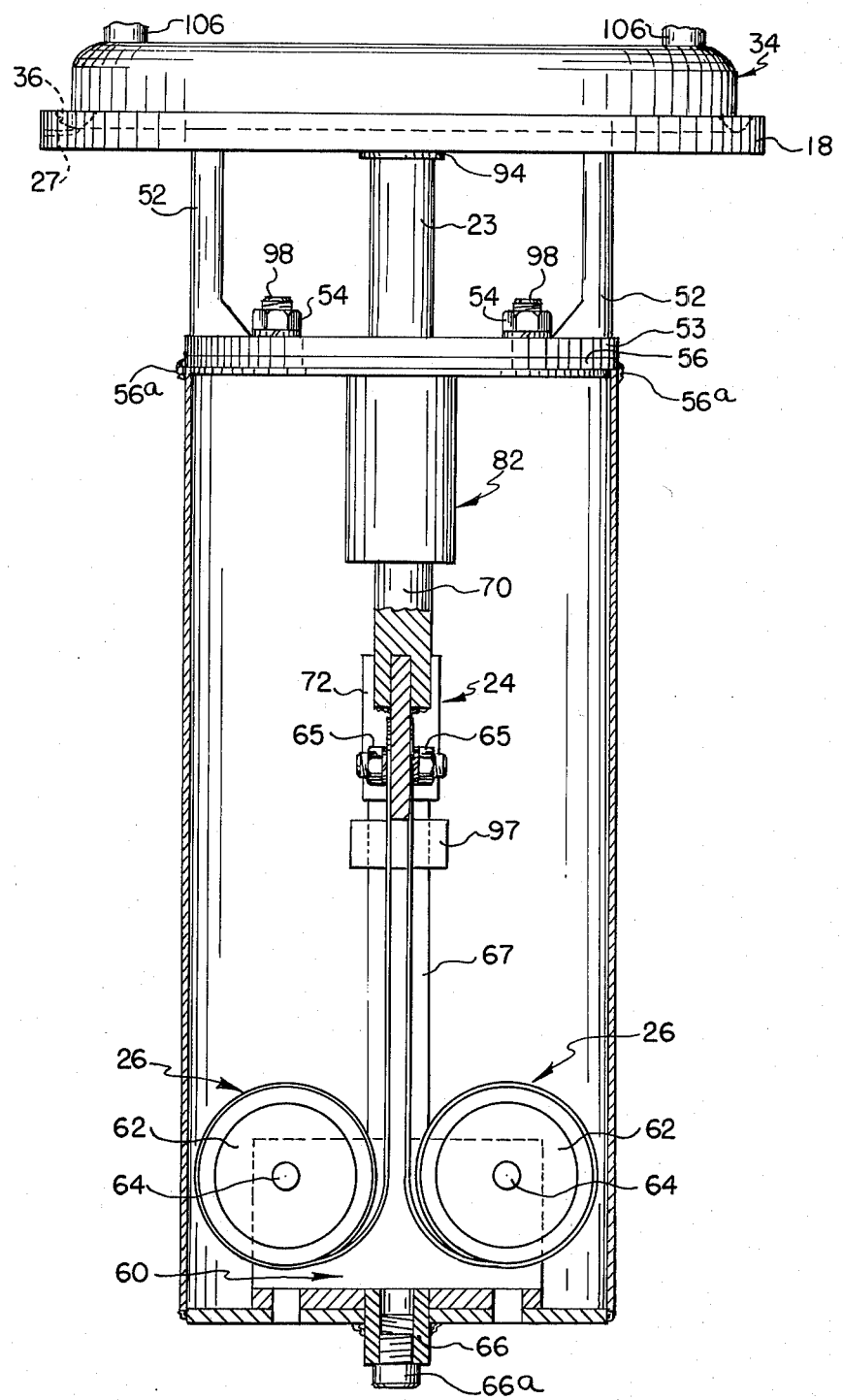
FIG. 2 is a view of the pressure relief valve taken generally along the plane of line 2—2 of FIG. 1, looking in the direction of the arrows.

As can be understood from FIGS. 1 and 2, upon upward movement of the valve member 20 due to excess fluid pressure in the storage tank, since upper stem 23 and lower stem 70 are coupled together by the threaded shank 80 and socket 78, the stem and guide assembly 24 moves upwardly thereby pulling upwardly on the constant force spring means 26 rotatably mounted on the bracket 60 in the housing 28, to cause the springs to be extended against their resistance to extension.

The coupling 22 including the lower stem 70 passes through a stuffing box structure 82 which comprises in the embodiment illustrated a tubular collar 84 attached to plate 56 and having a bearing bushing 86 (FIG. 1) disposed therein as by means of removable retainer washer 86a, and which facilitates the sliding movement of the lower stem 70 with respect to the stuffing box 82. A sealing member 88 (FIG. 1), such as an O-ring, is provided in an upper slot 89 in collar 84 coacting with the exterior of the lower stem as the latter moves upwardly and downwardly relative to the stuffing box 82, to seal the interior of housing 28 to prevent seepage of material from the tank into the housing 28.

Figure 10:
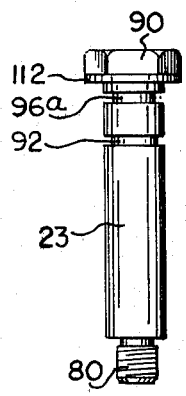
FIG. 10 is an elevational view of the upper stem for securing the valve member to the lower guide and stem assembly of FIG. 7 the valve mechanism.
Figure 11:
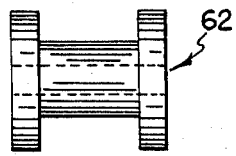
FIG. 11 is an elevational view of one of the spools utilized to mount one of the constant force springs thereon, utilized in biasing the valve member toward closed condition.

Referring now in particular to FIG. 10, the upper stem 23 comprises a head 90 which is adapted to coact with the valve member 20 to couple the valve member to the spring means 26 via the coupling means 22 including the lower stem and guide assembly 24. The upper stem may have a groove 92 formed therein adapted to removably receive a spring retainer 94 (FIG. 1) for securing the stem to the valve 20 in both vertical directions. A seal such as O-ring 96 (FIGS. 1 and 2) may be provided in groove 96a for sealing the upper stem with respect to the receiving opening 48 in valve member 20.

Stop collars 97 are secured on the respective column 67 for limiting the downward movement of the lower stem and guide assembly 24 with respect to the columns upon detachment of the upper stem 23 from the lower stem 70. As can be seen from FIG. 1, the upper stem 23 with its head 90 coacting with the valve member preferably holds the lower stem and guide assembly 24 in predetermined raised position with respect to the stop collars 97, and maintains the spring means 26 under predetermined initial tension loading. If the upper stem 23 is rotatably threaded out of coacting relation with the lower stem, the spring means coacting with the lower stem and guide assembly 24 will cause downward movement of the latter until engagement between the guides 72 and the stops 97, occur, thus limiting the retraction of the spring means 26.

In this connection, the length of the threaded shank 80 of upper stem 23 is preferably such that even when the lower stem and guide assembly is in the aforementioned "retracted" condition, wherein the guides 72 engage the stops 97, the upper stem including shank portion 80 is of such length in its extended position through opening 48 in the valve member 20 that it can still threadedly engage the threaded socket 78 in the lower stem 70 and can then commence to raise the lower stem and guide assembly 24 up to the position illustrated in FIG. 1, to cause a predetermined loaded condition of the spring means 26.

Also, in this way, the valve 20 and cover portion 34 can be removed from the valve mechanism while the latter is still mounted on the tank, and providing access to the upper exterior end of the housing canister. The latter arrangement thus provides for access to aforementioned seal 88, which will be exposed exteriorly of the tank through aperture 21, and which seal 88 can then be replaced without removing the entire valve mechanism from the tank.

Figure 3:
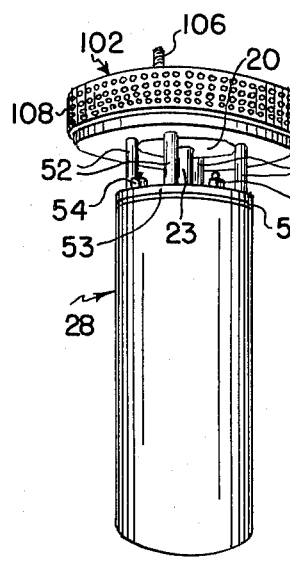
FIG. 3 is a reduced size, side perspective view of the valve mechanism of the invention, illustrating the shield mounted on the valve member for aiding in weather proofing the valve and preventing pilferage of the contents of the storage tank, resulting in a tamper proof valve mechanism.
Figure 5:
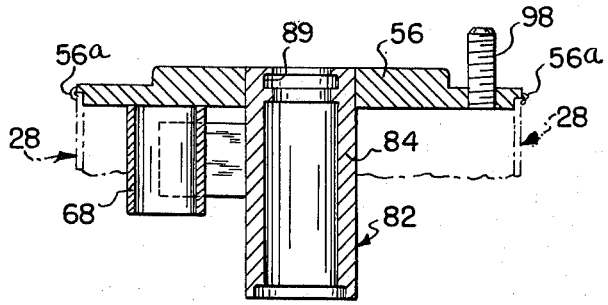
FIG. 5 is a sectional view of stuffing box structure taken generally along the plane of line 5—5 of FIG. 6 looking in the direction of the arrows.
Figure 6:
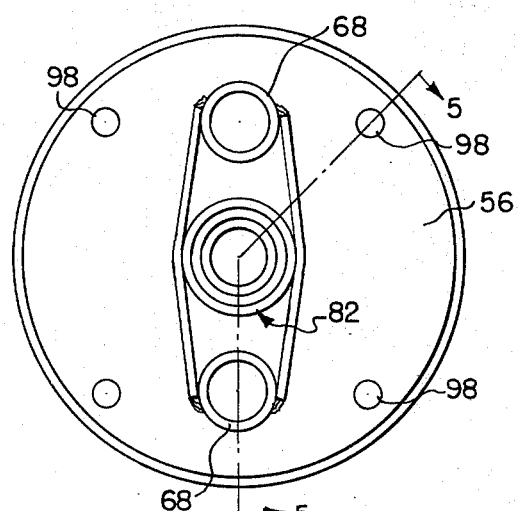
FIG. 6 is a bottom planned view of the stuffing box structure illustrated in FIG. 5.

Also, as can be seen from, for instance, FIGS. 2, 3 and 5 of the drawings, the upper plate 56 of the housing or canister 28, may be provided with threaded studs 98 projecting upwardly therefrom adapted to be received through openings in ring 53 and receive thereon aforementioned threaded fasteners 5t4 whereby, the housing 28 is detachably connected as a unit from the aforementioned posts 52, thus providing for separation of the sealed housing or canister from the posts and attached valve seat 18, for replacement of the housing or canister as a unit if the latter should become necessary or desirable, upon removal of the valve mechanism from the tank T.

The valve mechanism is preferably provided with a weather shield 102 (FIGS. 3 and 4) which comprises in the embodiment illustrated a flat plate having openings 104 therethrough which receive upstanding studs 106 secured to the top wall of the cover portion 34 of the valve member and cover assembly. Such shield 102 prevents weather elements such as rain, snow, etc. from obtaining ready access to the intake valve area, thus aiding in preventing contamination of the contents in the tank in the event of opening of the in-breathing valve member or members 44 in the valve member 20. Conventional seals 107 can be inserted through the shanks 106 and associated nut fasteners 106a for preventing unthreading of the nuts 106a, and thereby providing an indication when or if the shield 102 has been tampered with. It will be seen that with the shield in place on top of the cover portion, access to the upper stem member 23 is prevented, thereby preventing pilferage from contents of the tank, and with the fasteners 16 holding the valve seat to the tank, likewise being enclosed by the cover portion 34 and mounted shield 102. The side wall 108 of the shield 102 is preferably perforated as at 110, to provide ready escape of exhaust gases from internally of the shield during opening of the valve member 20. Perforated side wall 108 also functions as a fire screen. The parts of the valve mechanism are preferably formed of corrosion resistant material, such as, for instance, stainless steel, so as to prevent corrosion of the valve mechanism and provide a long, maintenance free, life therefor.

Figure 4:
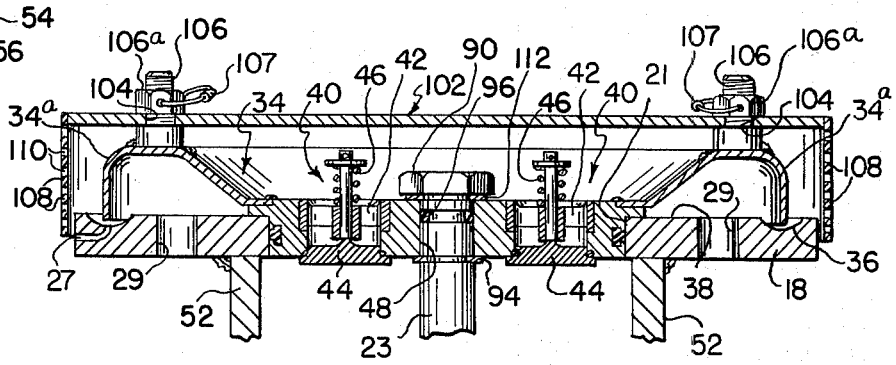
FIG. 4 is a fragmentary, vertical sectional view of the valve mechanism of FIGS. 1 through 3, showing the shield mounted on the valve, and the secondary valving in the pressure relief valve member, to provide for in-breathing of the container or storage tank, thereby preventing the fluid pressure interiorly of the storage tank from falling below a predetermined value.

A feature of the present arrangement that aids in preventing pilfering from the storage tank is that the upper stem is preferably provided with a friction eliminating means such as, for instance a "Teflon" washer 112 on the underside of the head 90 of the upper stem 23, with such friction resisting washer 112 being in engagement with the upper surface of the valve member 20 as can be best seen in FIG. 4. If someone on top of the tank T rotates the shield 102 thus causing rotation of the cover portion and valve member 120 with respect to the stem 23, the friction eliminating means 112 permits rotation without binding occurring between the underside of the head 90 of the upper stem and the valve member 20, and thus prevents unthreading of the upper stem from the coacting socket 78 in the lower stem member 70 and thus maintains the valve member 20 in positive coupled relation with the spring means 26 via the coupling means 22.

The constant force springs are sized and adjusted to suit the requirements of valve closing pressure specified, and when assembled the parts of the valve mechanism are locked in position to prevent change in use. The valve has the ability to allow large fluid pressure exhaust flow therethrough because once the valve 20 is cracked open (e.g. upon application of 32 pounds per square inch pressure) the force required to open it fully does not increase appreciably since the load on the springs does not increase with the length of travel and thus will allow materially greater exhaust flow as compared to prior art pressure relief valves. The valve can accept springs of varying size to suit the specifications required by the user, and the housing assembly with the spring power unit mounted therein does not need any adjustment and is preferably sealed in the container to prevent tampering thereof. The canister or container 28 with the spring power unit mounted therein can be readily replaced (upon removal of the unit from the storage tank) by merely unthreading stem 23 and removing fasteners 54, and substituting another canister unit of the same or different capacity for the one removed.

The travel of the exhaust valve to full open position is limited by the predetermined dimensions of the moving parts of the valve mechanism rather than the total force of the escaping exhaust gases against the valve member 20 and associated cover portion, due to the maintenance of a constant load by the spring means regardless of the travel required for fully open position of the valve member. Constant force spring means for presenting a constant restoring force regardless of displacement are per se known in the spring art, but so far as I am aware, no one heretofore has utilized such a spring arrangement in a valve mechanism, and especially a pressure relief valve mechanism.

Figure 12:
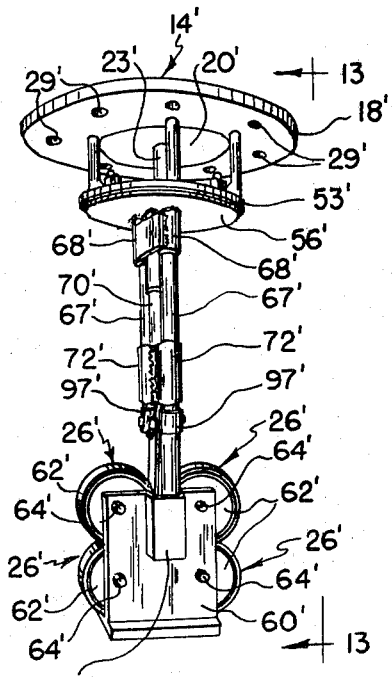
FIG. 12 is an elevational view of a modified embodiment of valve mechanism wherein a plurality of constant force springs are utilized in vertically journalled orientation, for urging the valve member toward closed condition.
Figure 13:
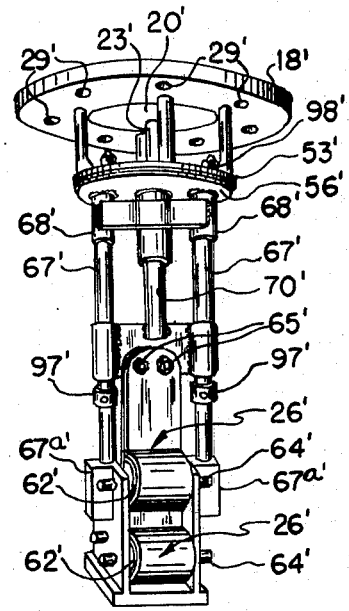
FIG. 13 is a view taken generally along the plane of line 13—13 of FIG. 12, looking in the direction of the arrows.

Referring now to FIGS. 12 and 13 there is shown another embodiment of high volume relief valve mechanism wherein a plurality of constant force spring 26' are disposed in vertically oriented relation on their respective spools as mounted on the bracket 60' which is adapted for securement to the bottom plate (not shown) of the associated housing or canister of the valve mechanism. Such an arrangement materially increases the force required to initially open the associated valve member 20' of the valve mechanism 14'. The upper distal ends of the tape springs of the vertically oriented constant force spring spools are disposed in juxtaposed condition and fastened together as at 65° in a generally similar manner as the first described embodiment. In other respects the modified valve mechanism is generally similar to that of the first described embodiment, and like parts have been numbered with a like reference numbers with the suffix prime (') being added thereto.

From the following description and accompanying drawings it will be seen that the invention provides a novel fluid pressure relief valve of high volume capacity which embodies constant force spring means for normally retaining a valve member in closed position, but wherein the fluid pressure force required to move the valve member remains substantially constant throughout the travel of the valve member, thus allowing a materially greater exhaust flow than prior art valves. The valve also provides a highly compact device of high venting capacity, and one wherein tampering of the valve device is prohibited and pilferage of the contents from an assoociated storage tank is prevented.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a fluid pressure relief valve for the vent opening in a fluid storage tank comprising, a valve member reciprocal to and from the vent opening to seal the same and when open to exhaust fluid pressure in the storage tank, means for retaining said valve member in normally closed condition, the last mentioned means comprising constant force spring means whereby the force required to move said valve member against the resistance of said last mentioned means remains substantially constant throughout the travel of the valve member, and including a base seat having an aperture adapted for disposal in communication with the vent opening, said valve member including sealing means adapted for sealing coaction between said member and said aperture in said base seat when said valve member is in said closed condition, said base seat having an upwardly facing exterior groove therein, said valve member including a laterally projecting cover portion which includes a downwardly projecting edge received within said groove and below the upper surface of said base seat which is adjacent said groove.

2. A valve in accordance with claim 1 including drain means coacting with said groove for draining liquid therefrom and thus preventing accumulation of liquid in said groove.

3. A valve in accordance with claim 1 wherein said groove has an upwardly and outwardly sloping defining side surface for directing the flow of exhaust fluid away from the associated storage tank upon movement of said valve member toward open condition.

4. A valve in accordance with claim 1 wherein said valve member comprises a disc, said groove being of circular configuration in plan, said cover portion being circular in plan, said cover portion and valve member being secured to said spring means by a threaded coupling stem, and means providing for rotary movement of said valve member and cover portion with respect to said stem without threadedly unfastening said stem from said spring means.

5. A valve in accordance with claim 1, coupling means connecting said spring means to said valve member and including a lower stem and a detachable upper stem, and a shield mounted on said valve and cover portion assembly and preventing ready access to said stems coupling said valve member to said spring means.

6. A valve in accordance with claim 5 wherein said shield is perforated for passage therethrough of gas from the associated tank upon opening movement of said valve member.

7. A valve in accordance with claim 5 wherein said shield includes means detachably coupling said shield to said valve in overlying and encompassing relation to the valve member and cover portion assembly, and means for resisting removal of said shield from said valve member and cover portion assembly without destroying the last mentioned means.

8. In a fluid pressure relief valve for the vent opening in a fluid storage tank comprising, a valve member reciprocal to and from the vent opening to seal the same and when open to exhaust fluid pressure in the storage tank, means for retaining said valve member in normally closed condition, the last mentioned means comprising constant force spring means whereby the force required to move said valve member against the resistance of said last mentioned means remains substantially constant throughout the travel of the valve member, and including a coupling means connecting said valve member to said spring means, said coupling means comprising an upper stem having a head coacting with said valve member and a shank depending therefrom, the lower end of said shank being threaded and adapted for detachable threaded coaction with a lower stem for securing the stems together, and a friction reducing member coacting with said head for facilitating rotation of said valve member with respect to said opening.

9. In a fluid pressure relief valve for the vent opening in a fluid storage tank comprising, a valve member reciprocal to and from the vent opening to seal the same and when open to exhaust fluid pressure in the storage tank, means for retaining said valve member in normally closed condition, the last mentioned means comprising constant force spring means whereby the force required to move said valve member against the resistance of said last mentioned means remains substantially constant throughout the travel of the valve member, and including a coupling means connecting said valve member to said spring means, said coupling means comprising an upper stem detachably connected to a lower stem member, and a sealed housing enclosing, said lower stem member and attached spring means and adapted for suspension in said vent opening, and sealing means coacting between said lower stem member and said housing for sealing the latter during movement of said coupling means upon opening and closing movements of said valve member.

10. A valve in accordance with claim 9 wherein said housing includes an upper wall having an opening therethrough, through which movably extends said lower stem, the last mentioned sealing means circumscribing said lower stem and coacting between the latter and said upper wall, said last mentioned sealing means being accessible from exteriorly of said upper wall upon detachment of said upper stem from said lower stem and removal of said valve member, whereby said last mentioned sealing means is replaceable while said valve is in mounted relation on the associated tank.

11. A valve in accordance with claim 10 including a stuffing box assembly depending from said upper wall into the interior of said housing, said stuffing box assembly including a cylindrical enclosure having an elongated tube-like bearing removably received therein, said last mentioned sealing means disposed above said bearing, laterally spaced sockets on said upper wall and depending therefrom, generally vertical rods received in the respective of said sockets, for positioning said rods in said housing and means coacting with said lower stem and said rods for guiding the movement of said lower stem during said opening and closing movements of said valve member.

12. A valve in accordance with claim 9 including a base seat having an aperture adapted for disposal in communication with the vent opening, with said housing being suspended from said base seat, said valve member being adapted to normally engage said seat for closing said aperture.

13. In a fluid pressure relief valve for the vent opening in a fluid storage tank comprising, a valve member reciprocal to and from the vent opening to seal the same and when open to exhaust fluid pressure in the storage tank, means for retaining said valve member in normally closed condition, the last mentioned means comprising constant force spring means whereby the force required to move said valve member against the resistance of said last mentioned means remains substantially constant throughout the travel of the valve member, and including valve means coacting with said valve member and providing for in-breathing of the valve mechanism when the latter is in mounted condition on an associated tank.

14. A valve in accordance with claim 13 including a base seat having an aperture therein adapted for communication with the vent opening, a housing disposed in depending relation from said base seat, said housing including a lower plate, said spring means comprising a spool rotatably mounted on said plate, and a constant force spring tape coacting with said spool, with the distal end of said spring tape projecting upwardly and being anchored via a coupling to said valve member for urging the latter toward said closed condition.

15. A valve in accordance with claim 14 wherein the last mentioned coupling comprises a lwoer stem and guide assembly disposed in said housing with said distal end of said spring means being secured thereto, said lower stem projecting upwardly, and an upper stem detachably coacting in threaded relation with said lower stem, said upper stem being coupled to said valve member.

16. A valve in accordance with claim 15 wherein said upper stem has a threaded shank at its lower end of predetermined length whereby said spring means is preloaded a predetermined amount by drawing said lower stem and guide assembly upwardly toward said valve member when said shank of said upper stem is threaded into said lower stem.

17. A valve in accordance with claim 16 including stop means in said housing for limiting contraction of said spring means to a predetermined amount upon detachment of said upper stem from said lower stem.

18. A valve in accordance with claim 16 wherein said upper stem including said shank is of a predetermined length, said stem having a head adjacent its upper end, and including stop means adapted for coaction with said coupling for limiting contraction of said spring means to a position wherein said upper stem is still able to commence threaded coaction with said lower stem after detachment of said upper stem from said lower stem.

19. A valve in accordance with claim 15 including column means extending upwardly from said lower plate in said housing, said guide assembly including means coacting with said column means for guiding the movement of said lower stem and guide assembly during extension and retraction of said spring means with respect to said lower plate during opening and closing movement of said valve member.

20. In a fluid pressure relief valve for the vent opening in a fluid storage tank comprising, a valve member reciprocal to and from the vent opening to seal the same and which when open to exhaust fluid pressure in the storage tank, means for retaining said valve member in normally closed condition, the last mentioned means comprising constant force spring means whereby the force required to move said valve member against the resistance of said last mentioned means remains substantially constant throughout the travel of the valve member, and including a coupling means connecting said valve member to said spring means, a base seat having an aperture normally closed by said valve member, said coupling means including a detachabale member coacting between said valve member and said spring means, a canister in which said spring means is disposed in generally sealed condition, and means detachably connecting said canister to said base seat, whereby the canister and associated spring means can be replaced as a unit.

\* \* \* \* \*